(12) United States Patent
Kahlen et al.

(10) Patent No.: US 11,674,027 B2
(45) Date of Patent: Jun. 13, 2023

(54) UPGRADED RECYCLED RELATIVELY POLYETHYLENE RICH POLYOLEFIN MATERIALS

(71) Applicant: BOREALIS AG, Vienna (AT)

(72) Inventors: Susanne Kahlen, Linz (AT); Michael Jerabek, Linz (AT)

(73) Assignee: BOREALIS AG, Vienna (AT)

(*) Notice: Subject to any disclaimer, the term of this patent is extended or adjusted under 35 U.S.C. 154(b) by 204 days.

(21) Appl. No.: 17/277,626

(22) PCT Filed: Oct. 2, 2019

(86) PCT No.: PCT/EP2019/076670
§ 371 (c)(1),
(2) Date: Mar. 18, 2021

(87) PCT Pub. No.: WO2020/070175
PCT Pub. Date: Apr. 9, 2020

(65) Prior Publication Data
US 2021/0347970 A1 Nov. 11, 2021

(30) Foreign Application Priority Data
Oct. 4, 2018 (EP) .................. 18198601

(51) Int. Cl.
| C08L 23/12 | (2006.01) |
| C08L 23/06 | (2006.01) |
| C08L 25/06 | (2006.01) |
| C08L 33/24 | (2006.01) |
| C08J 3/00 | (2006.01) |
| C08J 3/12 | (2006.01) |
| C08J 11/18 | (2006.01) |
| C08K 3/24 | (2006.01) |
| C08K 3/34 | (2006.01) |

(52) U.S. Cl.
CPC .............. *C08L 23/12* (2013.01); *C08J 3/005* (2013.01); *C08J 3/12* (2013.01); *C08J 11/18* (2013.01); *C08K 3/24* (2013.01); *C08K 3/346* (2013.01); *C08L 23/06* (2013.01); *C08L 25/06* (2013.01); *C08L 33/24* (2013.01)

(58) Field of Classification Search
CPC .......... C08L 2207/20; C08L 2205/035; C08L 23/12; C08L 23/06
See application file for complete search history.

(56) References Cited

U.S. PATENT DOCUMENTS
2009/0048403 A1 2/2009 Costantini et al.

FOREIGN PATENT DOCUMENTS

| CN | 104884525 A | 9/2015 |
| CN | 108025826 A | 5/2018 |
| EP | 0887379 A1 | 12/1998 |
| JP | 2009520847 A | 5/2009 |
| TW | 201602199 A | 1/2016 |
| WO | 1992/012182 A1 | 7/1992 |
| WO | 1999/024478 A1 | 5/1999 |
| WO | 2000/068315 A1 | 11/2000 |
| WO | 2003/087215 A1 | 10/2003 |
| WO | 2004/000899 A1 | 12/2003 |
| WO | 2004/111095 A1 | 12/2004 |
| WO | 2013/0025822 A1 | 2/2013 |
| WO | 2013/079457 A1 | 6/2013 |
| WO | 2015/0169690 A1 | 11/2015 |

OTHER PUBLICATIONS

Applicant: Borealis AG; Title: "Upgraded Recycled Relatively Polyethylene Rich Polyolefin Materials"; European Patent Application No. EP18198601.9; European Search Report, Date of Completion: Feb. 18, 2019; 7 pgs.
Taiwan Patent Application No. 108135658, Filed Oct. 2, 2019; Taiwan Office Action; Date of Completion: Jun. 9, 2020; 7 pgs.
Applicant: Borealis AG; "Upgraded Recycled Relatively Polyethylene Rich Polyolefin Materials"; Chinese Application No. 201980061227.8; Chinese Office Action dated Dec. 2, 2022; 18 pgs.
Applicant: Borealis AG; "Upgraded Recycled Relatively Polyethylene Rich Polyolefin Materials"; Korean Application No. 10-2021-7007975; Korean Notice of Allowance; dated Feb. 23, 2023; 3 pgs.

*Primary Examiner* — Jeffrey C Mullis
(74) *Attorney, Agent, or Firm* — Tarolli, Sundheim, Covell & Tummino LLP

(57) ABSTRACT

A polyethylene-polypropylene composition obtainable by blending a) 80 to 97 wt.-% of a blend (A) comprising A-1) polypropylene and A-2) polyethylene, wherein the ratio of polypropylene to polyethylene is from 3:7 to 13:7, and wherein blend (A) is a recycled material, which is recovered from a waste plastic material derived from post-consumer and/or post-industrial waste; and b) 3 to 20 wt.-% of a compatibilizer (B) being a heterophasic random copolymer comprising a random polypropylene copolymer matrix phase and an elastomer phase dispersed therein, whereby the heterophasic random copolymer has—a xylene insolubles content (XCI) of from 65 to 88 wt.-% (ISO 16152, led, 25° C.), and—a xylene soluble content XCS of 12 to 35 wt.-% (ISO 16152, led, 25° C.), the XCS fraction having an intrinsic viscosity (measured in decalin according to DIN ISO 1628/1 at 135° C.) of 1.2 dl/g to less than 3.0 dl/g, and—a flexural modulus of from 300 to 600 MPa (ISO 178, measured on injection moulded specimens, 23° C.); whereby the ratio of $MFR_2$ (blend (A))/$MFR_2$ (compatibilizer (B)) (ISO1133, 2.16 kg load at 230° C.), is in the range of 0.5 to 1.5.

11 Claims, No Drawings

UPGRADED RECYCLED RELATIVELY POLYETHYLENE RICH POLYOLEFIN MATERIALS

FIELD OF INVENTION

The present invention relates to a new polyolefin composition, which comprises a high quantity, such as greater than or equal to 30 wt-%, of a recycled relatively polyethylene rich material.

BACKGROUND

Polyolefins, in particular polyethylene and polypropylene are increasingly consumed in large amounts in a wide range of applications, including packaging for food and other goods, fibres, automotive components, and a great variety of manufactured articles. The reason for this is not only a favourable price/performance ratio, but also the high versatility of these materials and a very broad range of possible modifications, which allows tailoring of end-use properties in a wide range of applications. Chemical modifications, copolymerisation, blending, drawing, thermal treatment and a combination of these techniques can convert common-grade polyolefins into valuable products with desirable properties. This has led to huge amounts of polyolefin materials being produced for consumer applications.

During the last decade, concern about plastics and the environmental sustainability of their use in current quantities has arisen. This has led to new legislation on disposal, collection and recycling of polyolefins. There have, in addition, been efforts in a number of countries to increase the percentage of plastic materials, which are recycled instead of being sent to landfill.

In Europe, plastic waste accounts for approximately 27 million tons of waste a year; of this amount in 2016, 7.4 million tons were disposed of in landfill, 11.27 million tons were burnt (in order to produce energy) and around 8.5 million tons were recycled (http://www.plasticsrecyclers.eu/plastic-recycling accessed August 2018). Polyethylene based materials are a particular problem as these materials are extensively used in packaging. Taking into account the huge amount of waste collected compared to the amount of waste recycled back into the stream (amounting to only about 30%), there is still a great potential for intelligent reuse of plastic waste streams and for mechanical recycling of plastic wastes.

Taking the automobile industry as an example. In Europe the end of life (ELV) directive from the EU states that 85%/95% of materials from vehicles should be a recyclable or recoverable. The present rate of recycling of automobile components is significantly below this target. On average vehicles consist of 9 wt.-% plastics, out of this 9 wt.-% only 3 wt.-% is currently recycled. Therefore, there is still a need to be met if targets for recycling plastics in the automobile industry are to be achieved. This invention particularly focuses on mechanically recycled waste streams, as opposed to "energetic recycling", wherein polyolefins are burnt and used as energy. Due to cost reasons, poor mechanical properties and inferior processing properties waste streams containing cross-linked polyolefins are often used for energy recovery (e.g. incineration in a district heating plant or for heat generation in the cement industry) and are less often recycled into new products.

One major trend in the field of polyolefins is the use of recycled materials, which are derived from a wide variety of sources. Durable goods streams such as those derived from waste electrical equipment (WEE) or end-of-life vehicles (ELV) contain a wide variety of plastics. These materials can be processed to recover acrylonitrile-butadiene-styrene (ABS), high impact polystyrene (HIPS), polypropylene (PP) and polyethylene (PE) plastics. Separation can be carried out using density separation in water and then further separation based on fluorescence, near infrared absorption or raman fluorescence. However, it is commonly quite difficult to obtain either pure recycled polypropylene or pure recycled polyethylene. Generally, recycled quantities of polypropylene on the market are mixtures of both polypropylene (PP) and polyethylene (PE), this is especially true for post-consumer waste streams. Commercial recyclates from post-consumer waste sources have been found generally to contain mixtures of PP and PE, the minor component reaching up to <50 wt-%.

The better the quality of the recycled polyolefin the more expensive the material is. Moreover, recycled polyolefin materials are often cross-contaminated with non-polyolefin materials such as polyethylene terephthalate, polyamide, polystyrene or non-polymeric substances like wood, paper, glass or aluminium. This results in poor compatibility between the main polymer phases.

Such recycled polyethylene rich materials normally have properties, which are much worse than those of the virgin materials, unless the amount of recycled polyolefin added to the final compound is extremely low. For example, such materials often have poor performance in odour and taste, limited stiffness, limited impact strength and poor tensile properties and consequently do not fit consumer requirements. For several applications, e.g. cable sheathing, containers, automotive components or household articles it is of high importance that polyethylene blends show high stiffness (tensile modulus) as well as high impact strength and relatively high elasticity (tensile strain at break). This normally excludes the application of recycled materials for high quality parts, and means that they are only used in low-cost, non-demanding applications, such as e.g. bags for litter. In order to improve the mechanical properties of these materials, it has been proposed to add relatively large amounts of filler, together with compatibilizing/coupling agents and elastomeric polymers. These materials are generally virgin materials, with the polyolefin components being produced from petroleum.

US 2009/0048403 relates to polyolefin compositions comprising by weight A) 30 to 80% of a polyolefin component containing not less than 80% of a waste material selected from polyethylene, polypropylene or their mixtures and B) 20 to 70% of a heterophasic polyolefin composition having a flexural modulus equal to or lower than 600 MPa. Component B) comprises one or more propylene polymers selected from crystalline propylene homopolymers or copolymers of propylene with up to 10% of ethylene or other alpha-olefin comonomer(s) or their combinations, and (b) a copolymer or a composition of co-polymers of ethylene with other alpha-olefins and optionally with minor amounts of a diene (typically from 1 to 10% with respect to the weight of (b), said copolymer or composition containing 15% or more, in particular from 15% to 90%, preferably from 15 to 85% of ethylene. This application aims at materials with particular tensile properties, which can be used in flexible foils such as geo-membranes for agriculture, roofing and municipal pond applications. This application particularly demonstrates the use of heterophasic polyolefins to improve the properties of recycled polymer materials.

WO 03/087215 A1 is extremely general and relates to techniques for creating recycled plastic materials from waste plastic materials from a variety of sources such as office automation equipment (printers, computers, copiers, etc.), white goods (refrigerators, washing machines, etc.), consumer electronics (televisions, video cassette recorders, stereos, etc.), automotive shredder residue, packaging waste, household waste, building waste and industrial moulding and extrusion scrap. Pre-determined properties of the recycled plastic material can be controlled by selecting the types of waste plastic materials used in the recycling feed, determining the types and amounts of recycled plastic material recovered from a separation process and blending the recycled plastic material with other materials. This document relates to Acrylonitrile butadiene styrene (ABS) materials, High Impact Polystyrene (HIPS) materials, Polypropylene (PP) materials and Polycarbonate (PC) materials. This disclosure primarily relates to mixtures of different grades of polymers. Furthermore, this disclosure relates to materials containing a range of other additives such as carbon black and metals such as Cd, Pb, Hg, Cr and Ni.

WO 2013/025822 A1 relates to a process for creating polyolefin blends from waste streams with controlled rheological properties. In particular, specific $MFR_2$ values. In general, this document focuses on mixtures comprising polypropylene and polyethylene and compounding the mixture with one or more peroxides to produce a polyolefin blend. This document refers to the difficulties involved in separating polypropylene (PP) from high-density polypropylene (HDPE) and that this process is expensive. Furthermore, higher density plastics such as ABS and HIPS can also be found in these streams in small, but measurable amounts. The ratio of PP to HDPE in the PP products can be controlled by the mix of materials in the feed stream and/or by the degree of separation of the two plastic types.

EP 14167409 refers to blends of polypropylene and polyethylene, particularly recycled blends of polypropylene and polyethylene, which contain a specific kind of compatibilizer. The specific compatibilizer can lead to an increase in stiffness as well as impact strength and heat deflection resistance. Unfortunately, PP and PE are highly immiscible resulting in a blend with poor adhesion among its phases, coarse morphology and consequently poor mechanical properties. The compatibility between the phases of a blend can be improved by the addition of compatibilizers, which results in a finer and more stable morphology, better adhesion between the phases of the blends and consequently better properties of the final product.

Therefore, there is deeply felt need in the art for improving recycled materials in terms of their mechanical performances, i.e. improving the balance between stiffness (as measured by Tensile modulus ISO 1873-2), impact strength (Charpy Notched Impact Strength ISO 179-1 eA at +23° C. and at −30° C.) and tensile strain at break (measured according to ISO 527-2), while having a material that is also easily processable. In addition, there is still a need in the art for developing methods to increase the use of recycled material in higher value products e.g. in food packaging.

In order to improve the quality of recycled olefins, generally a quantity of virgin polyolefin is added to the recycled material, to give a polymer blend. The properties of the blend are often dependent on the composition, roughly according to equation 1 (Eq.1).

$$P(X_1)=X_1P(1)+(1-X_1)P(2) \qquad \text{Eq. 1}$$

where, P(X) is the particular property of the blend, P(1) is the property of the recycled material (blend (A)) and P(2) is the property of polymer 2 (compatibilizer (B)). This equation describes a linear relationship between the properties of materials and the weight fractions of each material added.

It is, therefore, important to find the concentration range ($X_1$) in which the properties of the components optimally fulfil the requirements for a particular use of the polymer mixture.

The use of compositions comprising high amounts (e.g. greater than 80 wt-%) of recycled polyolefin materials comprising greater than 20 wt. % PE, shows some drawbacks. In particular, it is presumed by persons skilled in the art that the use of high levels of recycled waste, may lead to poor mechanical properties compared to those of virgin polyethylene materials.

SUMMARY OF THE INVENTION

The present invention insofar provides
a polyethylene-polypropylene composition obtainable by blending
   a) 80 to 97 wt % of a blend (A) comprising
      A-1) polypropylene and
      A-2) polyethylene,
      wherein the ratio of polypropylene to polyethylene is from 3:7 to 13:7, and wherein blend (A) is a recycled material, which is recovered from a waste plastic material derived from post-consumer and/or post-industrial waste;
and
   b) 3 to 20 wt % of a compatibilizer (B) being a heterophasic random copolymer comprising a random polypropylene copolymer matrix phase and an elastomer phase dispersed therein, whereby
the heterophasic random copolymer has a
xylene insoluble content (XCI) of 65 to 88 wt.-% (ISO 16152, 1 ed, 25° C.) and a xylene soluble content XCS of 12 to 35 wt.-% (ISO 16152, 1 ed, 25° C.), the XCS fraction having an intrinsic viscosity IV(XCS) (measured in decalin according to DIN ISO 1628/1 at 135° C.) of 1.2 dl/g to less than 3.0 dl/g,
whereby the compatibilizer B) has a flexural modulus of from 300 to 600 MPa (ISO 178, measured on injection moulded specimens, 23° C.); and
whereby the ratio of $MFR_2$ (blend (A))/$MFR_2$ (compatibilizer (B)) (ISO1133, 2.16 kg load at 230° C.), is in the range 0.5 to 1.5,
whereby xylene insoluble content (XCI) and xylene soluble content (XCS) add up to 100 wt.-%.

The composition of the present invention has improved mechanical properties, such as improved strain at break and improved impact strength (notched Charpy impact strength (1 eA) non-instrumented (ISO179-1) at both +23° C. and −30° C.), compared to the raw recycled polyethylene rich material (blend (A)).

A significant finding of the present invention is that the polyethylene-polypropylene composition as described above has a good balance of stiffness (as determined by the tensile modulus measured according to ISO 527-2), notched impact strength at both low and ambient temperatures and strain at break. This is particularly surprising given the relatively low xylene soluble content XCS (measured according to ISO 16152, 1 ed, 25° C.) of the compatibilizer. Generally, a higher degree of xylene soluble content XCS is related to a higher amorphous content of a polymer. Using a compatibilizer with a high degree of XCS is therefore, generally seen as advantageous when seeking to improve the mechanical properties of polyolefin materials with high polyethylene contents. Furthermore, the compatibilizer has a relatively low intrinsic viscosity of the xylene soluble content IV (XCS) (measured in decalin according to DIN ISO 1628/1 at 135° C.).

The composition of the present invention shows mechanical properties, which at least have reduced the gap between the properties of virgin polyolefins with high PE contents and the recycled material. High stiffness, notched impact strength and strain at break are particularly advantageous for a number of applications. It is, for example, important for packaging applications, such as plastic drinks bottles that materials are stiff and resistant to deformation (as indicated by the tensile modulus) but also, that the materials are not brittle (as demonstrated by the Charpy notched impact test) and that they don't deform easily (thus having a high tensile strain at break). An additional advantage of the composition of the present invention is that the carbon footprint of articles manufactured from recycled polyolefin materials is significantly lower compared to products made from virgin materials. This means that the polyethylene-polypropylene compositions according to the present invention use significantly less petroleum and less energy than is generally required to create virgin plastics from petroleum.

In a further aspect, the present invention relates to the use of a compatibilizer (B) being a heterophasic random copolymer and comprising a random polypropylene copolymer matrix phase and an elastomer phase dispersed therein, whereby the heterophasic random copolymer has
a xylene insoluble content (XCI) of 65 to 88 wt.-% (ISO 16152, 1 ed, 25° C.) and
a xylene soluble content (XCS) of 12 to 35 wt.-% (ISO 16152, 1 ed, 25° C.), the XCS fraction having an intrinsic viscosity (measured in decalin according to DIN ISO 1628/1 at 135° C.) of 1.2 dl/g to less than 3.0 dl/g, whereby the compatibilizer (B) has a flexural modulus of 300 to 600 MPa (ISO 178, measured on injection moulded specimens, 23° C.);

for increasing the strain at break properties of a blend (A) comprising
A-1) polypropylene and
A-2) polyethylene, wherein the ratio of polypropylene to polyethylene is from 3:7 to 13:7, and wherein blend (A) is a recycled material, which is recovered from a waste plastic material derived from post-consumer and/or post-industrial waste;

whereby the ratio of MFR$_2$ (blend (A))/MFR$_2$ (compatibilizer (B)) (ISO1133, 2.16 kg load at 230° C.), is in the range 0.5 to 1.5.

and whereby compatibilizer (B) is present in an amount of 3 to 20-wt % with respect to the total weight of blend (A) and compatibilizer (B).

In a further aspect, the present invention relates to the use of a compatibilizer (B) being a heterophasic random copolymer and comprising a random polypropylene copolymer matrix phase and an elastomer phase dispersed therein, whereby the heterophasic random copolymer has
a xylene insoluble content (XCI) of 65 to 88 wt.-% (ISO 16152, 1 ed, 25° C.) and
a xylene soluble content (XCS) of 12 to 35 wt.-% (ISO 16152, 1 ed, 25° C.), the XCS fraction having an intrinsic viscosity (measured in decalin according to DIN ISO 1628/1 at 135° C.) of 1.2 dl/g to less than 3.0 dl/g, whereby the compatibilizer (B) has a flexural modulus of from 300 to 600 MPa (ISO 178, measured on injection moulded specimens, 23° C.);

for increasing impact properties of a blend (A) comprising
A-1) polypropylene and
A-2) polyethylene, wherein the ratio of polypropylene to polyethylene is from 3:7 to 13:7, and wherein blend (A) is a recycled material, which is recovered from a waste plastic material derived from post-consumer and/or post-industrial waste;

whereby the ratio of MFR$_2$ (blend (A))/MFR$_2$ (compatibilizer (B)) (ISO1133, 2.16 kg load at 230° C.), is in the range 0.5 to 1.5.

and whereby compatibilizer (B) is present in an amount of 3 to 20 wt % with respect to the total weight of blend (A) and compatibilizer (B).

In a further aspect, the current invention relates to an article comprising a polyethylene-polypropylene composition obtainable by blending
a) 80 to 97 wt % of a blend comprising
A-1) polypropylene and
A-2) polyethylene,
wherein the ratio polypropylene to polyethylene is from 3:7 to 13:7, and wherein blend (A) is a recycled material, which is recovered from a waste plastic material derived from post-consumer and/or post-industrial waste;
and
b) 3 to 20 wt.-% of a compatibilizer (B) being a heterophasic random copolymer comprising a random polypropylene copolymer matrix phase and an elastomer phase dispersed therein, whereby the heterophasic random copolymer has
a xylene insoluble content (XCI) of 65 to 88 wt.-% (ISO 16152, 1 ed, 25° C.), a xylene soluble content (XCS) of 12 to 35 wt.-% (ISO 16152, 1 ed, 25° C.), the XCS fraction having an intrinsic viscosity (measured in decalin according to DIN ISO 1628/1 at 135° C.) of 1.2 dl/g to less than 3.0 dl/g, whereby the compatibilizer (B) has a flexural modulus of from 300 to 600 MPa (ISO 178, measured on injection moulded specimens, 23° C.); and whereby the ratio of MFR$_2$ (blend (A))/MFR$_2$ (compatibilizer) (ISO1133, 2.16 kg load at 230° C.), is in the range 0.5 to 1.5, for use in a consumer application, such as e.g. in films or in food packaging.

In a preferred aspect, the polyethylene-polypropylene composition according to the current invention has a tensile modulus of at least 800 MPa (measured according to ISO 527-2 using injection moulded specimens as described in EN ISO 1873-2 (dog bone shape, 4 mm thickness)).

In a preferred aspect, according to the current invention the compatibilizer (B) has tensile strain at break (MD) of at least 500%.

In a preferred aspect, according to the current invention the compatibilizer (B) has a content of units derived from ethylene in the xylene insoluble (XCI) fraction of from 2.0 to 6.0 wt.-% and/or a content of units derived from ethylene in the xylene soluble (XCS) fraction of 25.0 to 38.0 wt.-%.

In a preferred aspect, according to the current invention the compatibilizer (B) has an MFR$_2$ (ISO1133; 2.16 kg; 230° C.) of 5 to 15 g/10 min and/or a total content of units derived from ethylene of 5.0 to 10.0 wt.-%.

In a preferred aspect, according to the current invention the xylene soluble XCS of compatibilizer (B) has an intrinsic viscosity (measured in decalin according to DIN ISO 1628/1 at 135° C.) of from 1.3 to less than 2.2.

In a preferred aspect, according to the current invention the compatibilizer (B) has flexural modulus of 400 to 550 MPa (ISO 178, measured on injection-moulded specimens, 23° C.).

In a preferred aspect, blend (A) according to the current invention has a content of limonene as determined using solid phase microextraction (HS-SPME-GC-MS) of greater than 0, but less than 200 ppm, preferably less than 100 ppm, more preferably less than 50 ppm, most preferably less than 35 ppm.

In a preferred aspect, according to the current invention blend (A) has a content of limonene as determined using solid phase microextraction (HS-SPME-GC-MS) of from 1 ppm to 100 ppm, preferably from 1 ppm to 50 ppm, more preferably from 2 ppm to 50 ppm, most preferably from 3 ppm to 35 ppm.

In a preferred aspect, the polyethylene-polypropylene composition according to the current invention has a notched Charpy impact strength (1 eA) (non-instrumented, ISO 179-1) of at least 6.0 kJ/m$^2$ and/or having notched Charpy impact strength (1 eA) (non-instrumented, ISO 179-1 at −30° C.) of at least 2.5 kJ/m$^2$ and/or a tensile strain at break (ISO 527-1,2) of at least 75%.

In a preferred aspect, according to the current invention the ratio of the tensile modulus of the final polyethylene-polypropylene composition versus the tensile modulus of blend (A) is at least 0.95.

In a preferred aspect, blend (A)
(i) contains less than 6.0 wt.-% polystyrene;
and/or
(ii) contains less than 3 wt.-% talc;
and/or
(iii) contains less than 5.0 wt.-% polyamide
and/or
(iv) contains less than 3 wt.-% chalk.

In a further preferred aspect, blend (A) contains
(v) 0 to 3.0 wt.-% stabilizers;
(vi) 0 to 1.0 wt.-% paper,
(vii) 0 to 1.0 wt.-% wood,
(viii) 0 to 0.5 wt.-% metal.

In a preferred aspect, the present invention relates to an article comprising the polyethylene-polypropylene composition, for use in a consumer application, such as e.g. piping applications or in films.

Definitions

Unless defined otherwise, all technical and scientific terms used herein have the same meaning as commonly understood by one of ordinary skill in the art to which the invention pertains. Although, any methods and materials similar or equivalent to those described herein can be used in practice for testing of the present invention, the preferred materials and methods are described herein. In describing and claiming the present invention, the following terminology will be used in accordance with the definitions set out below.

Unless clearly indicated otherwise, use of the terms "a," "an," and the like refers to one or more.

For the purposes of the present description and of the subsequent claims, the term "recycled waste" is used to indicate a material recovered from both post-consumer waste and industrial waste, as opposed to virgin polymers. Post-consumer waste refers to objects having completed at least a first use cycle (or life cycle), i.e. having already served their first purpose; while industrial waste refers to manufacturing scrap, which does not normally reach a consumer.

The term "virgin" denotes the newly produced materials and/or objects prior to their first use, which have not already been recycled.

Many different kinds of polyethylene or polypropylene can be present in "recycled waste". In particular, the polypropylene fraction can comprise: isotactic propylene homopolymers, random copolymers of propylene with ethylene and/or $C_4$-$C_8$ α-olefins, hetrophasic copolymers comprising a propylene homopolymer and/or at least one $C_4$-$C_8$ α-olefin copolymer and an elastomeric fraction comprising copolymers of ethylene with propylene and/or a $C_4$-$C_8$ α-olefin, optionally containing minor amounts of a diene.

The term "recycled material" such as used herein denotes materials reprocessed from "recycled waste".

A polymer blend is a mixture of two or more polymeric components. In general, the blend can be prepared by mixing the two or more polymeric components. Suitable mixing procedures known in the art are post-polymerization blending.

Post-polymerization blending can be dry blending of polymeric components such as polymer powders and/or compounded polymer pellets or melt blending by melt mixing the polymeric components.

A propylene random copolymer is a copolymer of propylene monomer units and comonomer units in which the comonomer units are distributed randomly over the polypropylene chain.

A "compatibilizer" is a substance in polymer chemistry, which is added to an immiscible blend of polymers in order to increase their stability.

"Polyethylene-polypropylene composition" refers to a composition containing both polypropylene and polyethylene in a mole ratio of from 7:3 to 3:7, wherein the relative amount of units derived from PE is greater than 30 wt.-%, preferably greater than 35 wt.-%, with respect to the total weight of the composition.

The term "elastomer" denotes a natural or synthetic polymer having elastic properties.

The term "XCS" refers to the Xylene cold soluble fraction (XCS wt.-%) determined at 23° C. according to ISO 6427

The term "XCI" refers to the xylene insoluble content determined at 25° C. according to ISO 16152, 1 ed If not indicated otherwise "%" refers to weight-%.

In the following, the details and preferred embodiments of the inventive polyolefin composition will be described in more detail. It is to be understood that these technical details and embodiments also apply to the inventive process and uses, as far as applicable.

DETAILED DESCRIPTION

The present invention is based on the findings that the addition of a soft, random heterophasic copolymer/RA-HECO (referred to throughout this application as compatibilizer (B)), to a recycling stream with poor properties containing polyethylene rich materials results in a material with a surprising degree of strain at break improvement, improved impact properties and a surprisingly low loss of stiffness. These properties are all desirable particularly in applications where the material is required to be stiff, without being brittle and wherein the material must be resistant to impact. The soft, random heterophasic copolymer (compatibilizer (B)) added to the recycling stream has a high tensile strain at break and also good impact properties and is characterised by a relatively low ethylene content, relatively low xylene soluble content (XCS), wherein the xylene soluble fraction has a low intrinsic viscosity (IV (XCS)).

In particular, given the relatively low amount of compatibilizer (B) used in the present invention, large improvements are seen in the tensile strain at break. Furthermore, the present invention is related to the use of a polyethylene-polypropylene composition as described hereinbefore for reducing the carbon footprint of polyethylene articles (or articles produced from polyethylene rich materials). This is especially advantageous in the field of infrastructure, engineering applications and packaging.

Blend (A)

The polyethylene-polypropylene composition according to the present invention comprises from 80 to 97 wt-% of blend (A). It is the essence of the present invention that blend (A) is obtained from a recycled waste stream. Blend (A) can be either recycled post-consumer waste, post-industrial waste, such as for example from the automobile industry, or alternatively, a combination of both.

Blend (A) is a polyethylene rich recycled material, meaning that it contains high amounts of polyethylene. Recycled waste streams, which are high in polyethylene can be obtained for example from cable sheathing manufacturers, film manufacturers and from waste packaging (e.g. flexible films or rigid caps) which is generally produced from polyethylene.

Preferably, the polyethylene rich recycled material is obtained from recycled waste by means of plastic recycling processes known in the art. Such recyclates are commercially available, e.g. from Corepla (Italian Consortium for the collection, recovery, recycling of packaging plastic wastes), Resource Plastics Corp. (Brampton, ON), Kruschitz GmbH, Plastics and Recycling (AT), Vogt Plastik GmbH (DE), Mtm Plastics GmbH (DE) etc. None exhaustive examples of polyethylene rich recycled materials include: DIPOLEN H (Mtm Plastics GmbH), food grade rHDPE (BIFFA PLC) and a range of polyethylene rich materials, such as e.g. HD-LM02041 from PLASgran Ltd. It is considered that the present invention could be applicable to a broad range of recycled polyethylene-rich materials or materials or compositions having a high content of recycled polyethylene. The polyethylene-rich recycled material may be in the form of granules. In a certain preferred embodiment, the recycled polyethylene rich materials is DIPOLEN (Mtm Plastics GmbH), such as DIPOLEN S or DIPOLEN H, preferably DIPOLEN H. DIPOLEN is obtained from domestic waste streams (i.e. it is a product of domestic recycling) for example the "yellow bag" recycling system, which operates in some parts of Germany.

Blend (A) may have a relative amount of units derived from ethylene of greater than 20 wt-%, preferably greater than 27 wt-%, more preferably greater than 30 wt-%, more preferably greater than 35 wt-%, more preferably greater than 40 wt-% with respect to the total weight of the composition.

In addition, blend (A) may have relative amount of units derived from propylene of greater than 40 wt-%, but less than 65 wt-%, with respect to the total weight of the composition.

The polyethylene fraction of the recycled material can comprise recycled high-density polyethylene (rHDPE), recycled medium-density polyethylene (rMDPE), recycled low-density polyethylene (rLDPE) and the mixtures thereof. In a certain embodiment, the recycled material is high density PE with an average density of greater than 0.8 g/cm$^3$, preferably greater than 0.9 g/cm$^3$, most preferably greater than 0.91 g/cm$^3$.

The ratio of polypropylene to polyethylene in blend (A) may be from 3:7 to 13:7, such as around 1.4:1.

According to the present invention, blend (A) preferably has a content of limonene as determined using solid phase microextraction (HS-SPME-GC-MS) of from 1 ppm to 100 ppm, preferably from 1 ppm to 50 ppm, more preferably from 2 ppm to 50 ppm, most preferably from 3 ppm to 35 ppm. Limonene is conventionally found in recycled polyolefin materials and originates from packing application in the field of cosmetics, detergents, shampoos and similar products. Therefore, blend (A) contains limonene, when blend (A) contains material that originates from domestic waste streams.

According to the present invention, blend (A) preferably has a content of limonene as determined using solid phase microextraction (HS-SPME-GC-MS) of greater than 0, but less than 200 ppm, preferably less than 100 ppm, more preferably less than 50 ppm, most preferably less than 35 ppm.

The fatty acid content is yet another indication of the recycling origin of blend (A).

Preferably, blend (A) of the polyethylene-polypropylene composition of the present invention contains:

(i) contains less than 6.0 wt.-% polystyrene;
and/or
(ii) contains less than 3 wt.-% talc;
and/or
(ix) contains less than 5.0 wt.-% polyamide
and/or
(x) contains less than 3 wt.-% chalk.

Compatibilizer (B)

Recycled polyolefin materials generally contain a mixture of PE and PP. Unfortunately, PE and PP are highly immiscible resulting in a blend with poor adhesion among its phases, coarse morphology and consequently poor mechanical properties. The compatibility between the phases of a blend can be improved by the addition of compatibilizers, which results in a finer and more stable morphology, better adhesion between the phases of the blends and consequently better properties of the final product.

In the literature several kinds of compatibilizers are known, such as block copolymers, e.g. ethylene-propylene block copolymer and styrene-ethylene/butylene-styrene or triblock copolymers, or ethylene propylene rubber (EPR), ethylene/propylene diene copolymer (EPDM) or ethylene/vinyl acetate copolymer (EVA).

The compatibilizer (B) of the present invention is a heterophasic random copolymer (RAHECO) comprising a random polypropylene copolymer matrix phase and an elastomer phase dispersed therein. This material is preferably a virgin polyolefin. The addition of the compatibilizer (B) according to the present invention to the recycled polypropylene material results in a surprising degree of strain at break improvement and an improvement in impact properties, while maintaining a relatively stiff/rigid material.

Generally, a heterophasic random copolymer of propylene is a propylene copolymer comprising a propylene random copolymer matrix component (1) and an elastomeric copolymer component (2) of propylene with one or more of ethylene and/or $C_4$-$C_8$ alpha olefin co-monomers, wherein the elastomeric (amorphous) copolymer component (2) is (finely) dispersed in said propylene random copolymer matrix polymer (1). Preferably, the 02, 04-08 alpha olefin co-monomers are ethylene co-monomers.

Generally, compatibilizer (B) is a material with a relatively low xylene soluble content (XCS), wherein the xylene soluble fraction has a low intrinsic viscosity IV(XCS). The compatibilizer (B) generally has a xylene cold solubles content (XCS) (measured according to ISO 16152 1 ed at 25° C.) of from 12 to 35 wt.-%, more preferably from 15 to 30 wt-%, most preferably from 20 to 25 wt-%, such as e.g. around 23 wt.-%.

Moreover, the xylene soluble content (XCS) of the compatibilizer (B) may have an intrinsic viscosity IV(XCS) (measured in decalin according to DIN ISO 1628/1 at 135° C.) of from 1.2 dl/g to less than 3.0 dl/g, preferably from 1.3 dl/g to less than 2.2 dl/g, more preferably from 1.5 dl/g to less than 2.0 dl/g, and most preferably from 1.6 dl/g to 1.8 dl/g.

In an aspect of the present invention, the compatibilizer (B) has a total content of units derived from ethylene of 1.0 to 20.0 wt.-%, preferably from 5.0 to 10.0 wt.-% such as about 8.0 wt.-%. In the polyethylene-polypropylene composition according to the present invention, the compatibilizer (B) preferably has a content of units derived from ethylene in the xylene cold solubles (XCS) fraction (which corresponds to properties of the elastomeric (amorphous) copolymer component (2) of compatibilizer (B)) of 25.0 to 38.0 wt.-%, preferably between 30.0 and 35.0 wt.-%. In a certain embodiment, the compatibilizer (B) preferably has a content of units derived from ethylene in the xylene insoluble (XCI) fraction of 2.0 to 6.0 wt.-%.

The compatibilizer (B) of the present invention preferably has a density of from 800 to 1000 kg m$^{-3}$, preferably from 850 to 950 kg m$^{-3}$, more preferably from 890 to 920 kg m$^{-3}$, such as from 900 to 910 kg m$^{-3}$.

The present invention, preferably, provides a polyethylene-polypropylene composition, wherein the compatibilizer (B) has a tensile strain at break of at least 400%, preferably at least 500%, most preferably from 650% to 850%. Without wishing to be bound by any theory, addition of a material with a very high tensile strain at break is believed to improve the properties of the composition leading to a rigid/stiff material, which is not brittle.

The present invention preferably provides a polyethylene-polypropylene composition, wherein the compatibilizer (B) has an MFR$_2$ (ISO1133; 2.16 kg; 230° C.) of from 2 to 20 g/10 min, preferably from 5 to 15 g/10 min, more preferably from 5 to 10 g/10 min, such as about 7 g/10 min.

In addition, the compatibilizer (B) may have a flexural modulus of from 350 to 550 MPa (ISO 178, measured on injection moulded specimens, 23° C.), preferably around 400 to 500 MPa. Compatibilizers with a flexural modulus of 300 MPa or lower shall not be used as the stiffness/impact balance of the polyethylene-polypropylene composition remains rather moderate with these compatibilizers.

The compatibilizer (B) as defined in the instant invention, may contain up to 2.0 wt.-% additives, selected from the group of nucleating agents, antioxidants, slip agents and talc among others. The same additives as described in more detail below with respect to the polyethylene-polypropylene composition may be present in compatibilizer (B).

The compatibilizer (B) can be a commercially available grade of a heterophasic random copolymer or can be produced e.g. by conventional polymerisation processes and process conditions using e.g. a conventional catalyst system known in the literature.

Production of Compatibilizer (B)

One feasible polymerisation process including the conditions and catalyst system is generally described below for compatibilizer (B), which is a polypropylene based heterophasic random copolymer RAHECO. The polymers can be polymerised e.g. in an optional pre-polymerisation reactor following the first reactor (preferably loop reactor) and then in a second reactor (preferably first gas phase reactor) preferably using the conditions as described below.

As to polymerisation of the heterophasic random copolymer of propylene, the individual components (matrix and elastomeric components) of the PP copolymer can be produced separately and blended mechanically by mixing in a mixer or extruder. However, if preferred the random polypropylene copolymer comprising the matrix component and the elastomeric component are produced in a sequential process, using reactors in serial configuration and operating at different reaction conditions. Consequently, each fraction prepared in a specific reactor can have its own molecular weight distribution, MFR$_2$ and/or comonomer content distribution.

The heterophasic random copolymer according to this invention is preferably produced in a sequential polymerisation process, i.e. in a multistage process, known in the art, wherein the matrix component is produced at least in one slurry reactor, preferably in one slurry reactor, and optionally and preferably in a subsequent gas phase reactor (gpr), and subsequently the elastomeric component is produced at least in one, i.e. one or two, gas phase reactor(s) (gpr), preferably in one gpr.

Accordingly, it is preferred that the heterophasic random copolymer is produced in a sequential polymerisation process comprising the steps of a) polymerising propylene and optionally at least one ethylene and/or C$_4$ to C$_{12}$ (x-olefin), preferably propylene as the only monomer, in the presence of a catalyst in a first reactor (R1), b) transferring the reaction mixture of the polymerised first polypropylene, preferably propylene homopolymer, fraction together with the catalyst, into a second reactor (R2), c) polymerising in the second reactor (R2) and in the presence of said first polypropylene polymer, propylene and optionally at least one ethylene and/or C$_4$ to C$_{12}$ olefin, preferably propylene as the only monomer, in obtaining thereby the second polypropylene fraction, preferably said second polypropylene fraction is a second propylene homopolymer, whereby said first polypropylene fraction and said second polypropylene fraction form the matrix component of the heterophasic random copolymer, d) transferring the reaction mixture of the polymerised matrix component of step (c) into a third reactor (R3), e) polymerising in the third reactor (R3) and in the presence of the matrix component obtained in step (c), propylene and at least one ethylene and/or C$_4$ to C$_{12}$ (x-olefin) obtaining thereby the elastomeric component of the polypropylene copolymer, wherein the elastomeric propylene copolymer component is dispersed in said matrix component.

Optionally, the elastomeric component of the heterophasic random copolymer can be produced in two reactors, whereby after above step (e), the process further comprises the following steps of:

f) transferring the PP product of step (e) in which the first elastomeric propylene copolymer fraction polymerised in the third reactor (R3) is dispersed in said matrix component in a fourth reactor (R4), and g) polymerising in the fourth reactor (R4) and in the presence of the mixture obtained in step (e) propylene and at least one ethylene and/or C$_4$ to C$_{12}$ (x-olefin)

obtaining thereby the second elastomeric propylene copolymer fraction; whereby the first elastomeric propylene copolymer fraction of step (e) and the second elastomeric propylene copolymer fraction of step (g) are both dispersed in the matrix component of step (c) and together form the heterophasic random copolymer.

A preferred multistage process is a "loop-gas phase"-process, such as that developed by Borealis A/S, Denmark (known as BORSTAR® technology) described e.g. in patent literature, such as in EP 0 887 379, WO 92/12182 WO 2004/000899, WO 2004/111095, WO 99/24478, WO 99/24479 or in WO 00/68315.

A further suitable slurry-gas phase process is the Spheripol® process of Lyondell Basell.

The compositions of the present invention can be prepared by mechanically blending the components using techniques used in the art for the preparation of polyolefin blends. For example, one can use Banbury, Buss, or Brabender mixers, single-screw or twin-screw extruders.

Polyethylene-Polypropylene Composition

The polyethylene-polypropylene composition according to the present invention is composed of a blend of recycled polypropylene (blend (A)) and a compatibilizer (B).

In a preferred aspect, the polyethylene-polypropylene composition contains 15 wt.-% or less of compatibilizer (B), preferably 10 wt.-% or less, more preferably 5 wt.-% or less. In a preferred aspect, the polyethylene-polypropylene composition contains at least 83 wt.-% of blend (A), preferably at least 85 wt.-% of blend (A), more preferably at least 90 wt.-% of blend (A). A rather high amount of compatibilizer (B) is desirable for producing materials with desirable properties for end consumer applications.

In a preferred aspect, the polyethylene-polypropylene composition according to the current invention may also contains:
organic fillers, and/or
inorganic fillers, and/or
additives Examples of inorganic fillers for use in the composition can include ash, talc, glass fibres or wood fibres.

Examples of additives for use in the composition are pigments or dyes (for example carbon black), stabilizers (anti-oxidant agents), anti-acids and/or anti-UVs, antistatic agents, nucleating agents and utilization agents (such as processing aid agents). Generally, the amount of these additives is in the range of 0-5 wt.-%, preferably in the range of 0.01 to 3 wt.-%, more preferably from 0.01 to 2 wt.-% based on the weight of total composition.

Examples of antioxidants which are commonly used in the art, are sterically hindered phenols (such as CAS No. 6683-19-8, also sold as Irganox 1010 FF™ by BASF), phosphorous based antioxidants (such as CAS No. 31570-04-4, also sold as Hostanox PAR 24 (FF)™ by Clariant, or Irgafos 168 (FF)™ by BASF), sulphur based antioxidants (such as CAS No. 693-36-7, sold as Irganox PS-802 FL™ by BASF), nitrogen-based antioxidants (such as 4,4'-bis(1,1'-dimethylbenzyl)diphenylamine), or antioxidant blends.

Anti-acids are also commonly known in the art. Examples are calcium stearates, sodium stearates, zinc stearates, magnesium and zinc oxides, synthetic hydrotalcite (e.g. SHT, CAS-No. 11097-59-9), lactates and lactylates, as well as calcium stearate (CAS No. 1592-23-0) and zinc stearate (CAS No. 557-05-1);

Common antiblocking agents are natural silica such as diatomaceous earth (such as CAS No. 60676-86-0 (SuperfFloss™), CAS-No. 60676-86-0 (SuperFloss E™), or CAS-No. 60676-86-0 (Celite 499®)), synthetic silica (such as CAS-No. 7631-86-9, CAS-No. 7631-86-9, CAS-No. 7631-86-9, CAS-No. 7631-86-9, CAS-No. 7631-86-9, CAS-No. 7631-86-9, CAS-No. 112926-00-8, CAS-No. 7631-86-9, or CAS-No. 7631-86-9), silicates (such as aluminium silicate (Kaolin) CAS-no. 1318-74-7, sodium aluminum silicate CAS-No. 1344-00-9, calcined kaolin CAS-No. 92704-41-1, aluminum silicate CAS-No. 1327-36-2, or calcium silicate CAS-No. 1344-95-2), synthetic zeolites (such as sodium calcium aluminosilicate hydrate CAS-No. 1344-01-0, CAS-No. 1344-01-0, or sodium calcium aluminosilicate, hydrate CAS-No. 1344-01-0).

Anti-UVs are, for example, Bis-(2,2,6,6-tetramethyl-4-piperidyl)-sebacate (CAS-No. 52829-07-9, Tinuvin 770); 2-hydroxy-4-n-octoxy-benzophenone (CAS-No. 1843-05-6, Chimassorb 81).

Nucleating agents like sodium benzoate (CAS No. 532-32-1); 1,3:2,4-bis(3,4-dimethylbenzylidene)sorbitol (CAS 135861-56-2, Millad 3988).

Suitable antistatic agents are, for example, glycerol esters (CAS No. 97593-29-8) or ethoxylated amines (CAS No. 71786-60-2 or 61791-31-9) or ethoxylated amides (CAS No. 204-393-1).

Usually these additives are added in quantities of 100-2.000 ppm for each individual component of the polymer The polyethylene-polypropylene composition preferably contains between 1.0 and 2.0 wt.-% PO ash.

The polyethylene-polypropylene composition according to the invention has a good balance of stiffness (tensile modulus) and ductility (tensile strain at break) i.e. it is not brittle, as compared to the pure recycled material. It should be noted, that the composition of the present invention is characterized not by any single one of the defined mechanical property features, but by their combination. By this combination of features, it can advantageously be used in many application fields, such as in pipes, cable protection and road (and rail) side structure.

The present invention preferably provides a polyethylene-polypropylene composition having a tensile modulus measured according to EN ISO 1873-2 (dog bone shape, 4 mm thickness) of at least 800 MPa, preferably of at least 900 MPa. In a preferred aspect, the present invention preferably provides a polyethylene-polypropylene composition having a tensile modulus in the range of 800 to 1600 MPa, more preferably in the range from 900 to 1400 MPa and most preferably in the range from 1000 to 1200 MPa.

The tensile modulus of the polyethylene-polypropylene composition is preferably at least 85% of the tensile modulus of raw blend (A) without compatibilizer (B), more preferably at least 90%, still more preferably at least 95%

Preferably, the notched Charpy impact strength (1 eA) (non-instrumented, ISO 179-1) measured at 23° C. is at least 5, preferably at least 5.5, more preferably at least 6, and up to an optional maximum of 7. In addition, the notched Charpy impact strength (1 eA) (non-instrumented, ISO 179-1) measured at −30° C. is preferably at least 2, more preferably at least 2.5 and most preferably at least 3, and up to an optional maximum of 7.

Preferably, the polyethylene-polypropylene composition according to the present invention has a tensile modulus of at least 800 MPa and a notched Charpy impact strength (1 eA) (non-instrumented, ISO 179-1) measured at 23° C. of at least 5.5 and more preferably at least 6. In a preferred embodiment, the polyethylene-polypropylene composition according to the present invention has a tensile modulus of at least 800 MPa and a notched Charpy impact strength (1 eA) (non-instrumented, ISO 179-1) measured at −30° C. of at least 2.0, preferably at least 2.5. Without wishing to be bound by any theory having this combination of properties is advantageous for example in cable sheathing applications as it is important to have a cable sheath which is stiff; but, which is resistant to impact at ambient or low temperatures.

Furthermore, the polyethylene-polypropylene composition according to the present invention may have a notched Charpy impact strength (1 eA) (non-instrumented, ISO 179-1) of at least 6.0 kJ/m$^2$ or a tensile strain at break (ISO 527-1,2) of at least 75%, preferably at least 80%. Again, without wishing to be bound by any theory, this is important for applications where the polyolefin material must be resistant to impact; but, also able to extend/stretch somewhat without breaking.

Preferably, the polyethylene-polypropylene composition according to the present invention has a tensile strain at yield measured according to ISO 527-1,2 of at least 5%, or at least 10%, or at least 15%.

The polyethylene-polypropylene composition according to the present invention preferably has a nominal tensile strain at break measured according to ISO 527-1,2 of at least 75% and a tensile modulus of at least 800 MPa.

The ratio of the tensile modulus of the final polyethylene-polypropylene composition to the tensile modulus of blend (A) is preferably at least 0.90, most preferably at least 0.95. Meaning that the composition remains stiff despite addition of compatibilizer (B).

Preferably, the polyethylene-polypropylene composition according to the present invention has a reasonable melt flow rate (MFR$_2$), such as around 6 g/10 min (ISO1133, 2.16 kg load at 230° C.). Meaning that it is still possible to use the polyethylene-polypropylene composition in applications, which require injection moulding, such as for automobile parts.

Furthermore, the composition in the present invention preferably has a tensile stress at break determined according to ISO 527-2 of greater than 5 MPa, or greater than 9 MPa. Still further, the composition in the present invention preferably has a tensile strength determined according to ISO 527-2 of greater than 18 MPa, preferably greater than 20 MPa, more preferably greater than 22 MPa and optionally up to a maximum of 26 MPa. Without wishing to be bound by any theory, it is believed that despite addition of the compatibilizer the polyethylene-polypropylene composition is able to withstand approximately the same amount of force as raw blend (A).

The composition according to the present invention is further characterized in that it preferably has a tensile strain at tensile strength determined according to ISO 527-2/1 of greater than 5%, preferably greater than 10%, more preferably greater than 11%.

Process

It is appreciated that the present invention also refers to a process for producing the polyethylene-polypropylene compositions as defined herein. The process comprises the steps of a) providing blend (A) comprising polypropylene and polyethylene in a ratio of 3:7 to 13:7 in amount of at least 80 wt.-%, based on the total weight of the polyethylene-polypropylene composition, b) providing a compatibilizer (B) being a heterophasic random copolymer comprising a random polypropylene copolymer matrix phase and an elastomer phase dispersed therein in an amount from 3 to 20 wt.-%, based on the total weight of the polyolefin composition, wherein
the heterophasic random copolymer has
a xylene insoluble content (XCI) of 65 to 88 wt.-% (ISO 16152, 1 ed, 25° C.), and
a xylene soluble content (XCS) of 12 to 35 wt.-% (ISO 16152, 1 ed, 25° C.), the XCS having an intrinsic viscosity (measured in decalin according to DIN ISO 1628/1 at 135° C.) of 1.2 dl/g to less than 3.0 dl/g, and
the ratio of MFR$_2$ (blend (A))/MFR$_2$ (compatibilizer (B)) (ISO1133, 2.16 kg load at 230° C.), is in the range 0.5 to 1.5.

c) melting and mixing the blend of blend (A) and the compatibilizer (B)

d) optionally cooling down said mixture compound and pelletizing.

For the purposes of the present invention, any suitable melting and mixing means known in the art may be used for carrying out melting and mixing step c). However, melting and mixing step c) preferably takes place in a mixer and/or blender, high or low shear mixer, high-speed blender, or a twin-screw extruder. Most preferably, the melting and mixing step c) takes place in a twin-screw extruder such as a co-rotating twin-screw extruder. Such twin-screw extruders are well known in the art and the skilled person will adapt the melting and mixing conditions (such as melting temperature, screw speed and the like) according to the process equipment.

In a preferred aspect, optionally prior to the melting and mixing step (c) an additional dry mixing step of all components can be applied.

Typically the melt temperature in step (C) is around 140-220° C. for polyethylene-rich compounds, preferably between 145° C. and 180° C. e.g. at around 170° C. or around 160° C. Particularly for recycled material, which often contain additional, contaminating ingredients, the target would be to carry out the melting step at the lowest possible temperature. This would allow the cost of production to be kept low and helps to increase the sustainability effort and to minimize the additional odour and toxic fumes that are often generated with recyclate containing compounds at high temperatures from e.g. contaminating ingredients in the recyclate (such as e.g. PVC).

Additionally, the extruder or compounding unit may be equipped with one or more vacuum degassing units along the screw or screws, with or without the use of water-stripping units. The function of a water-stripping unit is to add small amounts of water into the melt upfront of a mixing decompression and vacuum degassing section. The result of this is to bring down both the smell, odour and toxicity, as well as to reduce the amount of volatiles in the final compound, which can lead to an unpleasant smelling/tasting material.

Uses

Preferably, the present invention is related to the use of the polyethylene composition according to the invention for reducing the carbon footprint in the production of objects listed below:

Non-pressure underground pipes and system parts for road and land drainage, for storm water applications, Cable protection, cable conduits both for underground applications, for road and rail applications, cable channels, cable marking and cable digging protection sheets and pipes, Road (and rail) side structure, include all types of auxiliary structures found along roadways (e.g., signs, roadway lighting systems, rail and barrier systems, sound and wind barriers, crash cushions etc.), Floor and floor protection, indoor and outdoor, Roofing materials and ingredient for roofing materials.

Additionally, due to the satisfactory tensile properties of the compositions of the present invention, they may be employed as films (with a thickness of 400 microns or less) or for flexible foils (with a thickness of more than 400 microns) such as geomembranes for agriculture, roofing applications and as pond liners. Typically, the compositions described herein are used as a core layer of a multilayer sheet (e.g. a three layer geomembrane sheet), where the external layers are made of various kinds of polyolefin materials. Without wishing to be bound by any theory, it is believed that recycled-polyolefin materials with improved properties, such as the polyethylene-polypropylene composition of the present invention, will in the future also be able to be used in a broader application field than today.

PREFERRED EMBODIMENTS

In the following the present invention is described in more detail, with respect to particularly preferred embodiments. All preferred aspects as discussed above shall also apply for these specifically preferred embodiments as far as appropriate. In the first preferred embodiment of the present invention, the composition comprises from 90 wt.-% to 95 wt.-% of a recycled polyethylene-rich blend (blend (A)). This embodiment aims at a polyethylene-polypropylene composition demonstrating acceptable mechanical properties, but containing a maximum amount of recycled polymer. In general, such a composition would be expected to have a high tensile modulus of greater than 800 MPa, preferably greater than 900 MPa; while achieving a Nominal tensile strain at break of greater than 100% i.e. the material should be stiff, but not brittle.

Insofar, the first preferred embodiment of the invention relates to a polyethylene-polypropylene composition having a tensile modulus of greater than 800 MPa obtainable by blending
  a) 90 to 97 wt.-% of a blend (A) comprising
    A-1) polypropylene and
    A-2) polyethylene,
    wherein the ratio of polypropylene to polyethylene is from 3:7 to 13:7, and
    wherein blend (A) is a recycled material, which is recovered from a waste
    plastic material derived from post-consumer and/or post-industrial waste; and
  b) 3 to 10 wt.-% of a compatibilizer (B) being a heterophasic random copolymer comprising a random polypropylene copolymer matrix phase and an elastomer phase dispersed therein, whereby
  the heterophasic random copolymer has
    a xylene insoluble content (XCI) of 65 to 88 wt.-% (ISO 16152, 1 ed, 25° C.),
    a xylene soluble content (XCS) of 12 to 35 wt.-% (ISO 16152, 1 ed, 25° C.), the XCS having an intrinsic viscosity (measured in decalin according to DIN ISO 1628/1 at 135° C.) of 1.3 dl/g to 2.2 dl/g, and
    a flexural modulus of from 300 to 600 MPa (ISO 178, measured on injection moulded specimens, 23° C.); and
  wherein, the ratio of $MFR_2$ (blend (A))/$MFR_2$ (compatibilizer (B)) (ISO1133, 2.16 kg load at 230° C.), is in the range 0.5 to 1.5.

In a second preferred embodiment of the invention, the composition comprises from 80 wt.-% to 90 wt.-% of a recycled polyethylene-rich blend (blend (A)). This embodiment aims at a composition with a high tensile modulus of greater than 900 MPa, but with enhanced nominal tensile strain at break of about 100% compared to the composition in the first preferred embodiment.

Insofar, the second preferred embodiment of the invention relates to a polyethylene-polypropylene composition having a tensile modulus of at least 900 MPa obtainable by blending
  a) 80 to 90 wt.-% of a blend (A) comprising
    A-1) polypropylene and
    A-2) polyethylene,
    wherein the ratio of polypropylene to polyethylene is from 3:7 to 13:7, and
    wherein blend (A) is a recycled material, which is recovered from a waste plastic material derived from post-consumer and/or post-industrial waste; and
  b) 10 to 20 wt.-% of a compatibilizer (B) being a heterophasic random copolymer comprising a random polypropylene copolymer matrix phase and an elastomer phase dispersed therein, whereby
  the heterophasic random copolymer has
    a xylene insoluble content (XCI) of 65 to 88 wt.-% (ISO 16152, 1 ed, 25° C.),
    a xylene soluble content (XCS) of 12 to 35 wt.-% (ISO 16152, 1 ed, 25° C.), the XCS having an intrinsic viscosity (measured in decalin according to DIN ISO 1628/1 at 135° C.) of 1.3 dl/g to 2.2 dl/g, and
    a flexural modulus of from 300 to 600 MPa (ISO 178, measured on injection moulded specimens, 23° C.); and
  wherein the ratio of $MFR_2$ (blend (A))/$MFR_2$ (compatibilizer (B)) (ISO1133, 2.16 kg load at 230° C.), is in the range 0.5 to 1.5, and wherein the composition has a nominal tensile strain at break (ISO 527-1,2) or at least 75%.

Experimental Section

The following Examples are included to demonstrate certain aspects and embodiments of the invention as described in the claims. It should be appreciated by those of skill in the art, however, that the following description is illustrative only and should not be taken in any way as a restriction of the invention.

Test Methods
  a) Tensile Modulus is measured according to ISO 527-2 (cross head speed=50 mm/min; 23° C.) using injection moulded specimens as described in EN ISO 1873-2 (dog bone shape, 4 mm thickness).
  b) The tensile modulus and tensile strain at break were measured according to ISO 527-2 (cross head speed=1 mm/min; test speed 50 mm/min at 23° C.) using injection moulded specimens as described in EN ISO 1873-2 (dog bone shape, 4 mm thickness). The measurement was done after 96 h conditioning time of the specimen.
  c) Tensile properties were determined on samples prepared from compression-moulded plaques having a sample thickness of 4 mm. Tensile modulus was determined according to ISO 527-2/1 B at 1 mm/min. and 23° C. To determine stress at yield and strain at yield, a speed of 50 mm/min was used. Tensile stress at break was measured using a speed of 50 mm/min.

d) The Tensile Strength was determined according to ISO 527 using injection moulded test specimens as described in EN ISO 1873-2 (170×10×4 mm).
e) The impact strength was determined as Charpy Notched Impact Strength according to ISO 179-1 eA at +23° C. and at −30° C. on injection moulded specimens of 80×10×4 mm prepared according to EN ISO 1873-2, according to this standard samples are tested after 96 hours.
f) Comonomer content: The comonomer contents of the copolymer was determined by quantitative Fourier transform infrared spectroscopy (FTIR) calibrated to results obtained from quantitative 13C NMR spectroscopy. Thin films were pressed to a thickness of between 300 to 500 μm at 190° C. and spectra recorded in transmission mode. Relevant instrument settings include a spectral window of 5000 to 400 wavenumbers ($cm^{-1}$), a resolution of 2.0 $cm^{-1}$ and 8 scans.
g) PE, PS, PA, PET and $TiO_2$ content: The comonomer content C was determined using a film thickness method using the intensity of the quantitative band I(q) and the thickness of the pressed film T using the following relationship: [I(q)/T]m+c=C where m and c are the coefficients determined from the calibration curve constructed using the comonomer contents obtained from 13C NMR spectroscopy. Comonomer content was measured in a known manner based on Fourier transform infrared spectroscopy (FTIR) calibrated with 13C-NMR, using Nicolet Magna 550 IR spectrometer together with Nicolet Omnic FTIR software. Films having a thickness of about 250 μm were compression moulded from the samples. Similar films were made from calibration samples having a known content of the comonomer. The comonomer content was determined from the spectrum from the wave number range of from 1430 to 1100 $cm^{-1}$. The absorbance is measured as the height of the peak by selecting the so-called short or long base line or both. The short base line is drawn in about 1410-1320 $cm^{-1}$ through the minimum points and the long base line about between 1410 and 1220 $cm^{-1}$. Calibrations need to be done specifically for each base line type. Also, the comonomer content of the unknown sample needs to be within the range of the comonomer contents of the calibration samples.
h) Talc and chalk content: TGA according to the following procedure:
   Thermogravimetric Analysis (TGA) experiments were performed with a Perkin Elmer TGA 8000. Approximately 10-20 mg of material was placed in a platinum pan. The temperature was equilibrated at 50° C. for 10 minutes, and afterwards raised to 950° C. under nitrogen at a heating rate of 20° C./min. The weight loss between ca. 550° C. and 700° C. (WCO2) was assigned to $CO_2$ evolving from $CaCO_3$, and therefore the chalk content was evaluated as:

Chalk content=100/44×WCO2

Afterwards the temperature was lowered to 300° C. at a cooling rate of 20° C./min. Then the gas was switched to oxygen, and the temperature was raised again to 900° C. The weight loss in this step was assigned to carbon black (Wcb). Knowing the content of carbon black and chalk, the ash content excluding chalk and carbon black was calculated as:

Ash content=(Ash residue)−56/44×WCO2−Wcb

Where Ash residue is the weight % measured at 900° C. in the first step conducted under nitrogen. The ash content is estimated to be the same as the talc content for the investigated recyclates.
i) MFR: melt flow rates were measured with a load of 2.16 kg ($MFR_2$) at 230° C. The melt flow rate is that quantity of polymer in grams which the test apparatus standardized to ISO 1133 extrudes within 10 minutes at a temperature of 230° C. under a load of 2.16 kg.
j) Amount of Metals
   was determined by x ray fluorescence (XRF)
k) Amount of Paper, Wood
   Paper and wood were determined by conventional laboratory methods including milling, floatation, microscopy and Thermogravimetric Analysis (TGA).

EXPERIMENTS

A number of blends were produced with DIPOLEN H, a polyethylene-rich recycled plastic material (from Mtm Plastics GmbH, materials according to the August 2018 specifications). In each of the blends 5 to 15 wt.-% of a reactor-derived compatibilizer was added. Compatibilizer (B) (compatibilizer 2) according to the present invention is a heterophasic random copolymer RAHECO. The comparative compatibilizer (compatibilizer 1) is a random copolymer and not a RAHECO.

The compositions were prepared via melt blending on a co-rotating twin screw extruder with 0.15 wt.-% of Songnox 1010FF (Pentaerythrityl-tetrakis(3-(3',5'-di-tert. butyl-4-5 hydroxyphenyl)), 0.15 wt.-% Kinox-68 G (Tris (2,4-di-t-butylphenyl) phosphite) from HPL Additives. The polymer melt mixture was discharged and pelletized. For testing the mechanical properties, specimens were produced and tested according to ISO 179 with 1 eA notched specimens to measure the Charpy notched impact strength and according to ISO 527-1/2 with 1A specimens to measure the tensile properties at room temperature.

TABLE 1

The composition of each of the Examples (in weight percent)

| Component | Comparative example 1 | Comparative example 2 | Example 1 | Example 2 |
|---|---|---|---|---|
| DIPOLEN H | 100 | 83 | 93 | 83 |
| Comparative compatibilizer (compatibilizer 1) | | 15 | | |
| Inventive compatibilizer (B) (compatibilizer 2) | | | 5 | 15 |
| IONOL CP[1] | | 0.15 | 0.15 | 0.15 |
| HOSTANOX P-EPQ FF[2] | | 0.15 | 0.15 | 0.15 |
| HC001A-B1[3] | | 1.7 | 1.7 | 1.7 |
| PO - ash content - gravimetric | | 1.5 | 1.5 | 1.45 |

Values are given in weight percent.
[1]Butylated Hydroxy Toluene (BHT) available from for example Oxiris Chemicals S.A.
[2]A phosphorus based secondary antioxidant supplied by Clariant International Ltd.
[3]A homo-polypropylene powder supplied by Borealis.

Dipolen H Properties:
PE>33 wt.-%,
PP>about 50 wt.-%,
weight ratio PP/PE=about 1.5:1
PS<5 wt.-%,
PA<1 wt.-%, PET traces,
Talc<3 wt.-%,
Chalk<3 wt.-%,
$TiO_2$<5 wt.-%
MFR (2.16 kg, 230° C., ISO1133)=7 g/10 min The relevant specification for all materials relates to that available in August 2018.

Limonene Content in DIPOLEN

Measurement

Limonene quantification was carried out using solid phase microextraction (HS-SPME-GC-MS) by standard addition.

50 mg ground samples were weighed into 20 mL headspace vials and after the addition of limonene in different concentrations and a glass-coated magnetic stir bar, the vial was closed with a magnetic cap lined with silicone/PTFE. Micro capillaries (10 pL) were used to add diluted limonene standards of known concentrations to the sample. Addition of 0, 2, 20 and 100 ng equals 0 mg/kg, 0.1 mg/kg, 1 mg/kg and 5 mg/kg limonene, in addition standard amounts of 6.6 mg/kg, 11 mg/kg and 16.5 mg/kg limonene were used in combination with some of the samples tested in this application. For quantification, ion-93 acquired in SIM mode was used. Enrichment of the volatile fraction was carried out by headspace solid phase microextraction with a 2 cm stable flex 50/30 μm DVB/Carboxen/PDMS fibre at 60° C. for 20 minutes. Desorption was carried out directly in the heated injection port of a GCMS system at 270° C.

GCMS Parameters:
Column: 30 m HP 5 MS 0.25*0.25
Injector: Splitless with 0.75 mm SPME Liner, 270° C.
Temperature program: −10° C. (1 min)
Carrier gas: Helium 5.0, 31 cm/s linear velocity, constant flow
MS: Single quadrupole, direct interface, 280° C. interface temperature
Acquisition: SIM scan mode
Scan parameter: 20-300 amu
SIM Parameter: m/Z 93, 100 ms dwell time

TABLE 2

Limonene content in DIPOLEN

| Sample | Limonen [mg/kg] HS-SPME-GC-MS[1] |
|---|---|
| Dipolen S | 31.5 ± 2.6 |
| Dipolen H | 3.4 ± 0.2 |

[1]Headspace Solidphase Microextraction. Materials available from mtm plastics GmbH, according to 2018 specifications.

Total Free Fatty Acid Content

Fatty acid quantification was carried out using headspace solid phase micro-extraction (HS-SPME-GC-MS) by standard addition.

50 mg ground samples were weighed in 20 mL headspace vial and after the addition of limonene in different concentrations and a glass coated magnetic stir bar the vial was closed with a magnetic cap lined with silicone/PTFE. 10 μL Micro-capillaries were used to add diluted free fatty acid mix (acetic acid, propionic acid, butyric acid, pentanoic acid, hexanoic acid and octanoic acid) standards of known concentrations to the sample at three different levels. Addition of 0, 50, 100 and 500 ng equals 0 mg/kg, 1 mg/kg, 2 mg/kg and 10 mg/kg of each individual acid. For quantification ion 60 acquired in SIM mode was used for all acids except propanoic acid, here ion 74 was used.

GCMS Parameter:
Column: 20 m ZB Wax plus 0.25*0.25
Injector: Split 5:1 with glass lined split liner, 250° C.
Temperature program: 40° C. (1 min) @6° C./min to 120° C., @15° C. to 245° C. (5 min)
Carrier: Helium 5.0, 40 cm/s linear velocity, constant flow
MS: Single quadrupole, direct interface, 220° C. inter face temperature
Acquisition: SIM scan mode
Scan parameter: 46-250 amu 6.6 scans/s
SIM Parameter: m/z 60.74, 6.6 scans/s

TABLE 3

Total fatty acid content in Dipolen

| Sample | Total fatty acid concentration [mg/kg][1] |
|---|---|
| Dipolen S | 70.6 |
| Dipolen H | 36.1 |

[1]The concentration of acetic acid, propionic acid, butyric acid, pentanoic acid, hexanoic acid, octanoic acid, nonanoic acid and decanoic acid in each sample was added together to give a totally fatty acid concentration value.

TABLE 4

Properties of Compatibilizers

| Properties | Units | Comparative compatibilizer (compatibilizer 1) | Inventive compatibilizer (B) (compatibilizer 2) |
|---|---|---|---|
| MFR (230° C., 2.16 kg) | g/10 min | 8 | 7 |
| Flexural modulus | MPa | 950 | 400 |
| C2 total | wt.-% | 2.7 | 8 |
| XCS | wt.-% | 3.7 | 23 |
| C2(XCS) | wt.-% | 10.7 | 32 |
| IV(XCS) | dl/g | 2.0 | 1.7 |
| Tensile strain at break | % | 550-600 | 650-850 |
| Density | Kg/m³ | 900-910 | 900-910 |

TABLE 5

Overview of the properties of each of the examples

| Property | Units | | Comparative example 1 No compatibilizer | Comparative example 2 Comparative compatibilizer | Example 1 5% Inventive compatibilizer (B) (compatibilizer 2) | Example 2 15% Inventive compatibilizer (B) (compatibilizer 2) |
|---|---|---|---|---|---|---|
| Nominal tensile strain at break | % | Mean | 43 | 103 | 87 | 110 |
| | | Std | 11 | 39 | 29 | 38 |
| Tensile modulus | MPa | Mean | 1051 | 1090 | 1017 | 972 |
| | | Std | 6 | 5 | 8 | 8 |

TABLE 5-continued

Overview of the properties of each of the examples

| Property | Units | | Comparative example 1 No compatibilizer | Comparative example 2 Comparative compatibilizer | Example 1 5% Inventive compatibilizer (B) (compatibilizer 2) | Example 2 15% Inventive compatibilizer (B) (compatibilizer 2) |
|---|---|---|---|---|---|---|
| Tensile strain at tensile strength | % | Mean | 10.54 | 10.7 | 11.45 | 11.76 |
| | | Std | 0.03 | 0.02 | 0.03 | 0.13 |
| Tensile strength | MPa | Mean | 23.79 | 24.97 | 23.29 | 22.76 |
| | | Std | 0.06 | 0.05 | 0.07 | 0.08 |
| Tensile stress at break | MPa | Mean | 5.96 | 8.06 | 5.58 | 10.96 |
| | | Std | 2.36 | 2.16 | 2.17 | 2.19 |
| Tensile stress at yield | MPa | Mean | 23.79 | 24.97 | 23.29 | 22.76 |
| | | Std | 0.06 | 0.05 | 0.07 | 0.08 |
| Impact strength at +23° C.[1] | kJ/m$^2$ | Mean | 6.12 | 5.85 | 6.44 | 7.25 |
| | | Std | 0.41 | 0.51 | 0.51 | 0.83 |
| | | failure type | | P[2] | C[3] | C[3] |
| Notched Impact strength at −30° C.[1] | kJ/m$^2$ | Mean | 3.22 | 4.32 | 2.76 | 3.01 |
| | | Std | 1.25 | 0.94 | 0.35 | 0.63 |
| | | failure type | C[3] | C[3] | C[3] | C[3] |

Notched impact strength relates to Charpy impact strength (1eA) (non-instrumented, ISO 179-1)
[1]Samples were measured after 96 hours.
[2]partial.
[3]complete.

The invention claimed is:

1. A polyethylene-polypropylene composition obtainable by blending:
a) 80 to 97 wt. % of a blend (A) comprising
A-1) polypropylene and
A-2) polyethylene,
wherein the weight ratio of polypropylene to polyethylene is from 3:7 to 13:7, and
wherein blend (A) is a recycled material, which is recovered from a waste plastic material derived from post-consumer and/or post-industrial waste; and whereby blend (A) has a content of limonene as determined by using solid phase microextraction (HS-SPME-GC-MS) of from 1 ppm to 100 ppm, and
b) 3 to 20 wt. % of a compatibilizer (B) being a heterophasic random copolymer comprising a random polypropylene copolymer matrix phase and an elastomer phase dispersed therein, whereby;
the heterophasic random copolymer has:
a xylene insoluble content (XCI) of from 65 to 88 wt. % (ISO 16152, 1 ed, 25° C.), and
a xylene soluble content XCS of 12 to 35 wt. % (ISO 16152, 1 ed, 25° C.), the XCS fraction having an intrinsic viscosity (measured in decalin according to DIN ISO 1628/1 at 135° C.) of 1.2 dl/g to less than 3.0 dl/g, and
a flexural modulus of from 300 to 600 MPa (ISO 178, measured on injection moulded specimens, 23° C.);
wherein the ratio of MFR$_2$ (blend (A))/MFR$_2$ (compatibilizer(B)) ((ISO1133, 2.16 kg load at 230° C.), is in the range 0.5 to 1.5; and
wherein xylene insoluble content (XCI) and xylene soluble content (XCS) add up to 100 wt. %, and wherein the polyethylene-polypropylene composition has a tensile modulus of at least 800 MPa (measured according to ISO 527-2) using injection moulded specimens as described in EN ISO 1873-2 (dog bone shape, 4 mm thickness)).

2. The polyethylene-polypropylene composition according to claim 1, whereby the compatibilizer (B) has a tensile strain at break (MD) of at least 500%.

3. The polyethylene-polypropylene composition according to claim 1, whereby the compatibilizer (B) has a content of units derived from ethylene in the xylene insoluble (XCI) fraction of from 2.0 to 6.0 wt. % and/or whereby the compatibilizer (B) has a content of units derived from ethylene in the xylene soluble (XCS) fraction of 25.0 to 38.0 wt. %.

4. The polyethylene-polypropylene composition according to claim 1, whereby the compatibilizer (B) has an MFR$_2$ (ISO1133; 2.16 kg; 230° C.) of 5 to 15 g/10 min and/or whereby the compatibilizer (B) has a total content of units derived from ethylene of 5.0 to 10.0 wt. %.

5. The polyethylene-polypropylene composition according to claim 1, whereby the xylene soluble (XCS) fraction of compatibilizer (B) has an intrinsic viscosity (measured in decalin according to DIN ISO 1628/1 at 135° C.) of 1.3 to less than 2.2 dl/g.

6. The polyethylene-polypropylene composition according to claim 1, whereby the compatibilizer (B) has a flexural modulus of 400 to 550 MPa (ISO 178, measured on injection-moulded specimens, 23° C.).

7. The polyethylene-polypropylene composition according to claim 1, whereby blend (A) has a content of limonene as determined by using solid phase microextraction (HS-SPME-GC-MS) of from 1 ppm to 100 ppm.

8. The polyethylene-polypropylene composition according claim 1, having a Charpy notched impact strength (1eA) (non-instrumented, ISO 179-1 at +23° C.) of at least 6.0 kJ/m$^2$ and/or having Charpy notched impact strength (1eA) (non-instrumented, ISO 179-1 at −30° C.) of at least 2.5 kJ/m$^2$ and/or a tensile strain at break (ISO 527-1,2) of at least 75%.

9. The polyethylene-polypropylene composition according to claim 1, whereby blend (A):
(i) contains less than 6.0 wt. % polystyrene; and/or
(ii) contains less than 3 wt. % talc; and/or
(iii) contains less than 5.0 wt. % polyamide and/or
(iv) contains less than 3 wt. % chalk.

10. A process for the manufacture of a polyethylene-polypropylene composition according to claim 1, wherein the process comprises the steps of:

a) providing blend (A) comprising polypropylene and polyethylene in a ratio of 3:7 to 13:7 in amount of at least 80 wt. %, based on the total weight of the polyethylene-polypropylene composition, whereby blend (A) has a content of limonene as determined by using solid phase microextraction (HS-SPME-GC-MS) of from 1 ppm to 100 ppm, b) providing a compatibilizer (B) being a heterophasic random copolymer comprising a random polypropylene copolymer matrix phase and an elastomer phase dispersed therein in an amount from 3 to 20 wt. %, based on the total weight of the polyolefin composition, wherein the heterophasic random copolymer has:

xylene insoluble content (XCI) of 65 to 88 wt. % (ISO 16152, 1 ed, 25° C.), and a xylene soluble content (XCS) of 12 to 35 wt. % (ISO 16152, 1 ed, 25° C.), the XCS having an intrinsic viscosity IV(XCS) (measured in decalin according to DIN ISO 1628/1 at 135° C.) of 1.2 dl/g to less than 3.0 dl/g, and the ratio of $MFR_2$ (blend (A))/$MFR_2$ (compatibilizer(B)) (ISO1133, 2.16 kg load at 230° C.), is in the range 0.5 to 1.5, and c) melting and mixing the blend of blend (A) and the compatibilizer (B)

d) optionally cooling down said mixture compound and pelletizing.

11. An article comprising the composition according to claim 1, for use in a consumer application.

* * * * *